Dec. 11, 1962  G. H. FIELDING  3,067,619
VAPOR SAMPLING DEVICE
Filed July 28, 1960
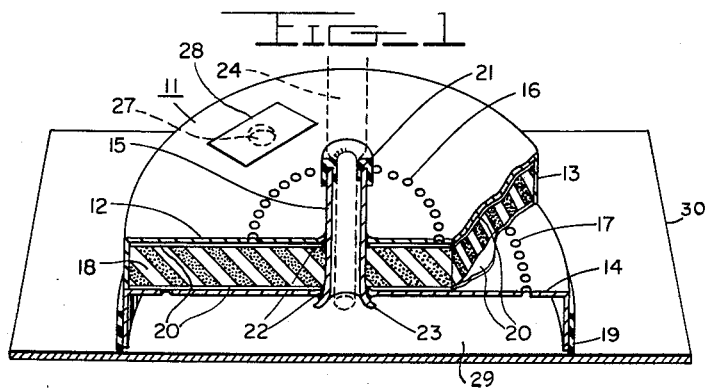
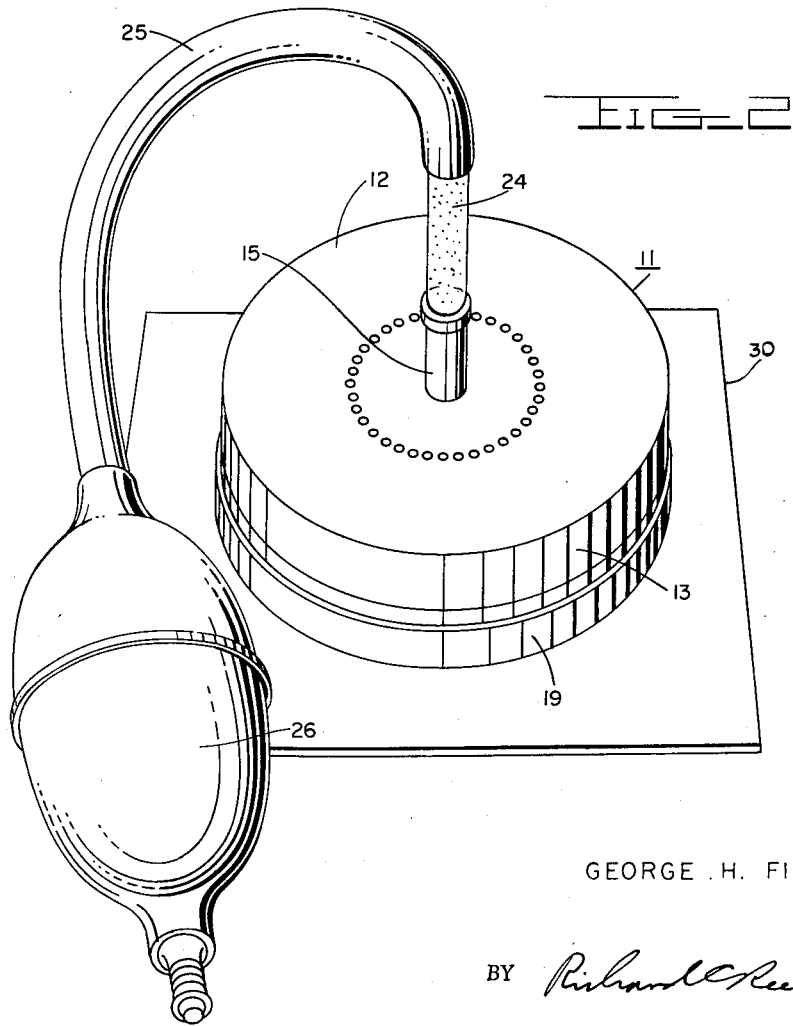
INVENTOR
GEORGE H. FIELDING
BY *Richard C. Reed*
ATTORNEY

3,067,619
VAPOR SAMPLING DEVICE
George H. Fielding, Alexandria, Va., assignor to the
United States of America as represented by the Secretary of the Navy
Filed July 28, 1960, Ser. No. 46,039
6 Claims. (Cl. 73—421.5)
(Granted under Title 35, U.S. Code (1952), sec. 266)

The invention described herein may be manufactured and used by or for the Government of the United States of America for governmental purposes without the payment of any royalties thereon or therefor.

This invention relates generally to a vapor sampling device and more particularly to a sampling device for localizing and collecting vapors of substances evolved from surface areas.

Shipboard evaluation of CW (chemical warfare) countermeasures is generally more complex than similar evaluation conducted ashore. Laboratory personnel, facilities and analytical instruments which are considered essential for CW studies can rarely be provided aboard ship. One method available for detecting and measuring CW contamination aboard ship involves the accumulation of vapor in an inverted cup, but this static technique has at times collected not more than 20% of the available vapor after prolonged operation.

In a more dynamic type technique for collecting CW-agent vapors, a suction tube or intake nozzle is held directly above the contaminated surface so that flushing air may be drawn downwind from the source. Obviously, this is a poor sampling technique for localizing and precisely defining small contaminated areas because of the confusing effects of wind speed, direction and turbulence. A stiff breeze may dilute the vapor to such an extent that even a strong vapor source may show little or no detectable vapor. Moreover, the flushing air that passes over the contaminated surface area would itself be contaminated with vapor before passing over that surface, and the assumption of a uniform flushing air is not justified.

There is at present, therefore, no adequate field device for measuring the vapor source strength of contaminated surfaces. "Vapor source strength" which appears throughout this application is a term which refers to the quantity of a substance that is vaporized per unit area per unit time, for example, milligrams of mustard gas per square meter per minute. The vapor source strength is a most useful indication of the hazards associated with persistent-agent contamination of either the skin-contact or the vapor-irritant type. Once the vapor source strength is known, data on the size of the contaminated area and a wind dilution factor lead directly to the vapor concentration to which personnel are being exposed and indirectly to the contact hazard.

An object of the present invention is to provide a field device which is used for measuring the vapor source strength of a CW-agent contaminant, which is constructed in such a way that it may be used effectively with detector kits currently used by the Armed Forces and which is relatively simple, compact, convenient, practical and inexpensive.

Another object of the invention is to provide an improved device for localizing and evolving a vapor substance from a surface area.

A further object of the invention is to provide a sampling device of high sensitivity in measuring the vapor source of a volatile substance evolved from a paint film, fabric, wood, soil, or other flat, hard surfaces.

A still further object of the invention is to provide means for measuring the vapor evolved from a hard surface without the disadvantages of previous devices which have been attributed to wind interferences, contaminated flushing air, indefinite sampling areas, or low volatility.

Various other objects and advantages will be apparent from the following description of one embodiment of the invention and the novel features will be particularly pointed out hereinafter in connection with the appended claims.

In the accompanying drawing:

FIG. 1 illustrates an embodiment of the present invention partly in section, partly broken away to show the general arrangement of parts;

FIG. 2 illustrates the embodiment of FIG. 1 in the environment of its use with a colorimeter tube, extension tubing and bulb aspirator.

Briefly, this invention provides a convenient sampler for measuring the vapor of a substance on a surface area by confining a portion of the surface and adjacent air layer, drawing filtered air over the confined surface area, and delivering the filtered air (which now contains vapor from the confined surface area) to a vapor detection means. Since the air drawn over the sampled area could pick up vapor from other portions of the surface before entering the confined area, it is initially filtered to provide substantially pure air over the sampled area.

In the illustrated embodiment, there is shown a surface confining means in the form of a cylindrical housing 11 having a top 12 and lateral side 13, whose circumferential lower edge rests flat upon a sampling surface 30. A horizontal partition 14 divides the inner space of the housing into an upper enclosed compartment 18 and a lower cup-shaped enclosure 29 described by the lateral side 13, the partition 14 and the sample surface 30 on which the device rests. The cylindrical housing may be constructed of any conventional metal, plastic or durable fiber board.

Extending vertically through the axis of the cylinder is a hollow, tubular stem 15 protruding through the top of the cylinder, while the other end thereof extends into and communicates with the lower cup-shaped enclosure. The top of said cylindrical housing has a plurality of openings 16 arranged in a uniform pattern about the tubular stem 15, while the horizontal partition 14 has a plurality of openings 17 uniformly arranged about said tubular stem. The two series of openings 16 and 17 are positioned at relatively wide distances apart from the tubular stem on top 12 and on horizontal partition 14, respectively, so that the air drawn through openings 16 will be swept across a considerable portion of the upper compartment 18 which contains an air filter, before entering the cup-shaped enclosure. It is also desirable that openings 17 should be positioned near the periphery of the horizontal partition so that air entering the cup-shaped enclosure will be swept over a large portion of the sampled area to evolve vapor more completely. The air filter in compartment 18, designated in the drawing by diagonal stripes, consists of a granular bed of activated charcoal. Disks of outing flannel 20 of approximately the same dimension and shape as the upper compartment are attached to the top and bottom faces of the compartment thereby covering the series of openings 16 and 17. The outing flannel prevents loss of filter material from the openings and also provides additional filtering means by withholding charcoal dust and other impurities from the flushing air. In place of the activated charcoal the filter may take the form of a carbon-impregnated paper or fabric interspersed and packed in compartment 18.

A soft, flexible sleeve 19 attached to the cylindrical wall provides for improved contact with the sample surface and thus prevents leakage of air from the edge of the cylinder wall. The sleeve may be a rubber band glued preferably to the outside wall and extending slightly below the circumferential edge to form a good grip with the sample surface. In another embodiment of the invention, not shown, the sleeve takes the form of an annular grommet with an insert groove therein for attaching the same to the edge of the cylinder wall. Similarly, rubber gasket 21 is fitted over the mouth of the tubular stem 15 to provide an air-tight seal for detector tube 24 (shown dotted in FIG. 1) having a larger diameter than the tubular stem 15.

A sturdy construction results by welding or soldering tubular stem 15 to the top and horizontal partition, shown at 22; the bottom of the stem is also flanged, as shown at 23, to form an air-tight, firm joint. It is also contemplated that the vapor sampler parts may be manufactured of injection-molded plastic and then vacuum metalized to reduce the sorption of vapors by the plastic material. The stem and housing may also be threaded to provide a removable screw-in construction.

A filling hole 27 at the top of the housing provides access to the filter compartment for filling and replacing the filter material, and the hole is subsequently closed, for example, with adhesive tape 28.

In the operation of the device, an air suction line applied to tubular stem 14 draws air into the air filter through openings 16; the air is rendered free of vapor and particle contaminants and passed into the cup-shaped enclosure or collector cup through the symmetrically arranged openings 17 whereby swept uniformly from all directions at a fixed rate causing any substance present on the surface area to be volatilized evenly therefrom and be swept out of the enclosure.

The invention as shown in FIG. 2 is used by way of example with a colorimeter tube 24 attached to an extension tubing 25 which is connected to an aspirator bulb 26. The aspirator bulb is fitted with a valve which impedes the reflow of air into tube 25 whenever the bulb is squeezed. The colorimeter tube has a broad visible center section containing a silica gel indicator of the type that undergoes a color change whenever a particular vaporizable material is passed through the tube. In operating the device, the colorimeter tube is initially opened at both ends; the extension tube affixed thereto and the other end is inserted into the vaporator stem 15. The end of the tube is held tightly against the rubber gasket 21 with one hand, while the aspirator bulb is operated with the other hand for any desired sampling time. The end of the tube 24 may descend to any depth into the stem 15 and the cup-shaped enclosure without noticeable change in characteristics as long as it is prevented from touching the sample surface.

In a preferred method the sampling is commenced by compressing the bulb every 2–3 seconds throughout the sampling period. The sampling period is chosen to bring the color in the colorimeter tube within the range of the color chart, preferably to match one of the standards closely. Using the sampling time and quantity of agent indicated by the chart, the source strength of the flushing air is expressed in micrograms per minute per sampled area, or in other suitable units. The temperature of the surface should also be recorded since the vapor source strength of a contaminated surface area varies approximately with the vapor pressure or volatility of the agent. For instance, it has been found that the vapor source strength of a surface contaminated with mustard gas will double as the centigrade temperature increases by about 8 degrees. A method suggested for measuring surface temperature of decks or bulkheads employs a common mercury thermometer laid flat on the surface under investigation and a small pad of cotton is placed over the bulb of the thermometer, insulating it from the air and the sun. The thermometer and pad are moved to a new point every 20 to 30 seconds until the thermometer reading becomes stabilized.

The vapor sampling device described herein is suitable for use on ships, vehicles and other areas of interest to the armed services, in which the objects to be tested have flat, hard surfaces. The vapor source of a curved surface can be estimated from that of an adjacent flat surface. Porous materials, such as fabrics, can also be tested for vapor source strength by placing the materials to be sampled on flat impermeable surfaces with the sleeve 19 of the sampler pressed firmly against the material. In this way essentially none of the flushing air will be drawn through the fabric under the sleeve of the sampler. If it is desired to use the vapor sampler on contaminated soil, the soil can be pressed flat with a suitable instrument, or a sample of the soil can be placed on a flat hard surface. In another embodiment of the present device, a sharp circumferential rim extending below the edge of the cup-shaped enclosure may be thrust into the soil until the edge of the cup-shaped enclosure is flush with the sample surface.

A shallow collector cup increases the velocity of air over the sample surface and consequently increases the quantity of vapor desorbed from the surface per unit time. The collector therefore should be shallow relative to the surface area which it bounds. A volume-to-surface ratio of about 0.8 provides for a sensitive and efficient device, although ratios as low as 0.4 have been constructed in which the collector cup is extremely shallow but which provides even greater sensitivity. By way of example but not subject to any size limitations presented: A compartment having a face area of 30 sq. cm. and a capacity of 24 ml. has a volume-to-surface ratio of 0.8. Two bulbfuls of air amounting to about 70 ml. aspirated through this volume are equal to almost three air changes and sweep 95 percent of the vapor out of the collector cup, assuming perfect mixing in about 4 seconds.

It should be understood of course that while a colorimeter tube is shown along with an aspirator bulb in the illustrated embodiment, this invention may be used in any sampling arrangement which requires localizing and removing the vapor of a substance from a painted surface, fabric, film, and the like. The present invention therefore provides a new and improved device for evolving a vapor substance from a surface area for the purpose of detecting, measuring, or retaining the same for future examination.

While a specific embodiment of the invention has been shown and described in detail to illustrate the application of the invention, it should be understood that the invention may be otherwise embodied without departing from the spirit and scope thereof and that within the scope of the appended claims the invention may be practiced otherwise than as specifically described.

What is claimed is:

1. A device for localizing and evolving the vapor of a substance from a surface area; said device comprising a housing means having an open base for communicating with the surface area under investigation, a plurality of inlet openings in said housing means disposed near the periphery of said open base, an outlet opening in said housing means centrally disposed with respect to said open base, and filter means affixed to said housing means and covering said plurality of inlet openings.

2. A device for localizing and evolving the vapor of a substance from a surface area; said device comprising a housing means having an open base for communicating with the surface area under investigation, sealing means associated with said open base for providing an air-tight seal between said housing means and said surface under investigation, a plurality of inlet openings in said housing means disposed near said sealing means, an outlet opening in said housing means centrally disposed with respect to said open base, and filter means affixed to said housing means and covering said inlet openings.

3. A device for localizing and evolving the vapor of a substance from a surface area; said device comprising a housing having an open base for communicating with the surface area under investigation, said open base having a sealing means for providing an air-tight seal upon contact with said surface under investigation, a partition within said housing parallel to said open base dividing the interior of said housing into two compartments, a closed compartment and a compartment having said open base, filter means disposed within and substantially filling said closed compartment, a first plurality of openings in said partition near the periphery thereof and a second plurality of openings disposed in the outer wall of said closed compartment and in misalignment with said first plurality of openings, and outlet means in communication with said open base and centrally disposed with respect to said first plurality of openings.

4. A device for localizing and evolving the vapor of a substance from a surface area according to claim 3 in which the air filter is of the group of materials containing activated charcoal, carbon impregnated paper and carbon impregnated fabric.

5. A device for localizing and evolving the vapor of a substance from a surface area; said device comprising a housing having an open base for communicating with the surface area under investigation, means for dividing said housing internally into an upper compartment adapted to contain a filter material and a lower compartment having said open base, a vertical tube, extending from the exterior of said housing and communicating with said lower compartment, a first plurality of openings in said housing communicating with said upper compartment and a second plurality of openings in said means for communicating with said lower compartment.

6. A vapor sampling device including a housing having a cylindrical air chamber with an open base, a compartment in said housing for containing a filter material, a first plurality of openings in said housing communicating with said compartment, a vertical tube extending into said housing and communicating with said chamber, said tube being axially disposed with respect to said cylindrical member, a second plurality of openings in said compartment communicating with said chamber near the periphery thereof.

References Cited in the file of this patent

UNITED STATES PATENTS

| | | |
|---|---|---|
| 1,864,544 | Lamb | June 28, 1932 |
| 2,786,355 | Day et al. | Mar. 26, 1955 |